(12) United States Patent
Maruyama et al.

(10) Patent No.: US 9,411,156 B2
(45) Date of Patent: Aug. 9, 2016

(54) OPTICAL SCANNER

(71) Applicant: Shinano Kenshi Kabushiki Kaisha, Ueda-shi, Nagano (JP)

(72) Inventors: Nobuchika Maruyama, Ueda (JP); Masayuki Kodani, Ueda (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 0 days.

(21) Appl. No.: 14/949,366

(22) Filed: Nov. 23, 2015

(65) Prior Publication Data
US 2016/0178896 A1 Jun. 23, 2016

(30) Foreign Application Priority Data

Dec. 17, 2014 (JP) ................................. 2014-255464

(51) Int. Cl.
*G02B 26/08* (2006.01)
*G02B 26/12* (2006.01)
(52) U.S. Cl.
CPC ................................... *G02B 26/121* (2013.01)
(58) Field of Classification Search
CPC ......... G02B 26/121; G02B 5/09; G02B 26/12
USPC ............................. 359/216.1–219.2, 850, 855
See application file for complete search history.

(56) References Cited

U.S. PATENT DOCUMENTS

| | | | |
|---|---|---|---|
| 3,772,464 A | * | 11/1973 | Chan ................... G02B 26/121 348/168 |
| 5,666,219 A | | 9/1997 | Ishizuka et al. |
| 2006/0017993 A1 | | 1/2006 | Hirose et al. |
| 2011/0116146 A1 | | 5/2011 | Oh et al. |

FOREIGN PATENT DOCUMENTS

JP 2000-330062 11/2000

OTHER PUBLICATIONS

European Search Report in corresponding European Patent Application No.: 15193686.1.

* cited by examiner

*Primary Examiner* — James Phan
(74) *Attorney, Agent, or Firm* — Stephen J. Weyer, Esq.; Stites & Harbison, PLLC.

(57) ABSTRACT

The optical scanner comprises: a rotor being attached to one end part of a rotor shaft; a polygon mirror having reflective surfaces and being attached to the rotor shaft; and a bearing section being provided to a stator housing and capable of rotatably holding the rotor shaft. A recessed part, through which the rotor shaft is penetrated, is formed in a top part of the polygon mirror. A retainer section of the rotor shaft, which is provided in the recessed part, and an elastic member, which is provided between the retainer section and an inner bottom part of the recessed part and which always biases the polygon mirror toward the rotor, are accommodated in the recessed part together with an end part of the rotor shaft.

4 Claims, 2 Drawing Sheets

OPTICAL SCANNER

CROSS-REFERENCE TO RELATED APPLICATION

This application is based upon and claims the benefit of priority of the prior Japanese Patent Application No. 2014-255464, filed on Dec. 17, 2014, and the entire contents of which are incorporated herein by reference.

FIELD

The present invention relates to an optical scanner, in which a polygon mirror (e.g., tilt mirror) capable of, for example, scanning light emitted from a light source and receiving a reflected light, is attached to a rotor shaft together with a rotor.

BACKGROUND

In an optical scanner, a polygon mirror having a regular polygon shape is fitting to a rotor shaft together with a rotor. Concretely, a rotor yoke is fixed to the rotor shaft, which is rotatably held by a stator housing. The polygon mirror is attached to the rotor yoke in a state where the polygon mirror is prohibited from rotating with respect to and detaching from the rotor yoke. To avoid deformation and strain, the polygon mirror is attached to the rotor yoke without being directly fixed to the rotor shaft. However, the polygon mirror is attached to an end part of the rotor shaft, so the polygon mirror is axially pressed toward the rotor yoke, so as not to detach, by a biasing member, e.g., plate spring, which is capable of biasing a top plate of the rotor yoke (see Patent Document 1).

PRIOR ART DOCUMENT

Patent Document 1: Japanese Laid-open Patent Publication No. 2000-330062

SUMMARY

In Patent Document 1, the top plate of the polygon mirror is generally formed flat, and the biasing member, e.g., press spring, for biasing the top plate is provided. Since the rotor shaft is penetrated through the polygon mirror and projected from an axial end surface of the mirror, an axial height of the optical scanner must be increased and the optical scanner must be large.

In case that a radiation range of a scanning light, which enters and is reflected on reflective surfaces, is wide, the scanning light will be irregularly reflected by the rotor shaft and the press spring provided to the end of the rotor shaft, and reflection performance of the scanning light on the reflective surfaces of the mirror will be lowered.

The present invention has been invented to solve the above described problems of the conventional technology.

Accordingly, an object of the present invention is to provide an optical scanner, which is capable of being downsized in an axial direction and maintaining sufficient reflection performance of a polygon mirror even if an irradiation range of a scanning light is widened.

To achieve the object, the present invention has following structures.

Namely, the optical scanner of the present invention comprises:
 a motor having a rotor shaft;
 a rotor being attached to one end part of the rotor shaft;
 a polygon mirror having reflective surfaces, the polygon mirror being attached to the rotor shaft together with the rotor; and
 a bearing section being provided to a stator housing and capable of rotatably holding the rotor shaft,
 a recessed part, through which the rotor shaft is penetrated, is formed in a top part of the polygon mirror, and
 a retainer section of the rotor shaft, which is provided in the recessed part, and an elastic member, which is provided between the retainer section and an inner bottom part of the recessed part and which always biases the polygon mirror toward the rotor, are accommodated in the recessed part together with an end part of the rotor shaft.

With the above described structure, the retainer section of the rotor shaft, which is provided in the recessed part, and the elastic member, which is provided between the retainer section and an inner bottom part of the recessed part and which always biases the polygon mirror toward the rotor, are accommodated in the recessed part together with the end part of the rotor shaft, so that an axial size of the optical scanner can be downsized. Further, they are accommodated in the recessed part, so that a scanning light is not irregularly reflected on the accommodated members and reflection performance of the polygon mirror can be sufficiently maintained even if an irradiation range of the scanning light is widened.

In the optical scanner, a spring member may be fitted between the inner bottom part of the recessed part and the retainer section. With this structure, by concentrically fitting the spring member to the rotor shaft penetrating through the recessed part and providing a retaining washer in the recessed part, the spring member is compressed, so that the polygon mirror (tilt mirror) can be pressed onto the rotor yoke by an elastic force of the spring member.

Preferably, the rotor and the polygon mirror (tilt mirror) are recession/projection-fitted to each other so as to prohibit from relatively rotating with respect to each other. With this structure, relative rotation of the polygon mirror (tilt mirror) with respect to the rotor can be prevented, and they can be easily assembled.

In the optical scanner, the polygon mirror (tilt mirror) may have a plurality of the inclined reflective surfaces whose inclination angles are different from each other. In this case, light quantity of the scanning light can be increased and a wide area can be scanned with a reflected light.

By the present invention, the optical scanner, which is capable of downsizing the axial size and maintaining sufficient reflection performance of the polygon mirror, can be provided.

BRIEF DESCRIPTION OF THE DRAWINGS

Embodiments of the present invention will now be described by way of examples and with reference to the accompanying drawings which are given by way of illustration only, and thus are not limitative of the present invention, and in which.

DESCRIPTION OF THE EMBODIMENTS

Preferred embodiments of an optical scanner relating to the present invention will now be described in detail with reference to the accompanying drawings. Firstly, the optical scanner, which reflects and irradiates a laser beam emitted from a laser irradiation unit in a wide range, will be explained.

Figure 1:
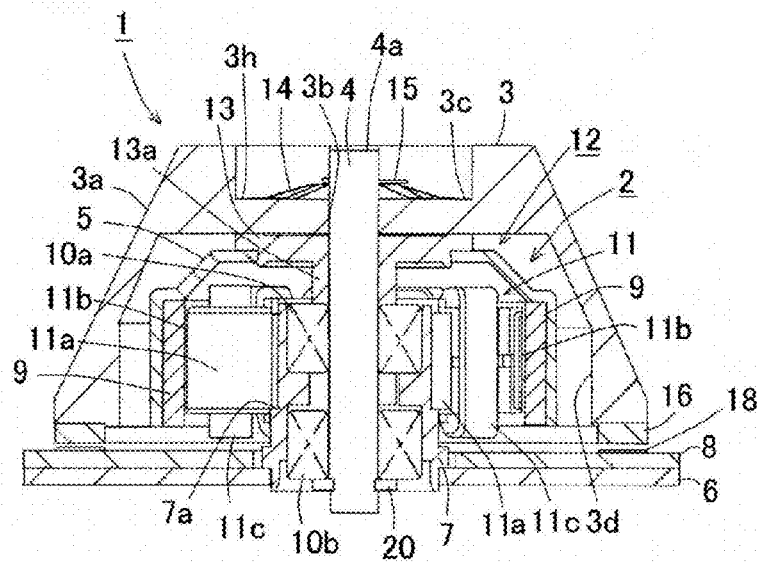
FIG. 1 is an axial sectional view of an optical scanner relating to the present invention.

As shown in FIG. 1, in the optical scanner 1, a tilt mirror (polygon mirror) 3 having a plurality of reflective surfaces (e.g., four reflective surfaces), whose inclination angles are different from each other, is attached to one end part of a rotor shaft 4 of a motor 2 together with a rotor yoke 5. The tilt mirror 3 and the rotor yoke 5 are prohibited from detaching from and rotating with respect to the rotor shaft 4.

Firstly, a structure of the motor 2 will be explained. A stator housing 7 is integrally attached to a base plate 6. A substrate 8, on which a Hall element for detecting magnetic poles of a rotor magnet 9, etc. are mounted, is attached on the base plate 6.

A first bearing section 10a and a second bearing section 10b are attached in the stator housing 7 which is formed into a cylindrical shape. For example, the first bearing section 10a and the second bearing section 10b are rolling bearings. A step-shaped part 7a is formed in an outer circumferential surface of the stator housing 7. A stator 11 is attached to the step-shaped part 7a. In the stator 11, a stator core 11a is covered with insulators and motor coils 11c are respectively wound on magnetic pole teeth 11b. The stator core 11a is fixed to the stator housing 7 by press fit and adhesive.

The rotor shaft 4 of a rotor 12 is rotatably held by the first bearing section 10a and the second bearing section 10b provided in the stator housing 7. The cylindrical rotor yoke 5 is integrally attached to a rotor hub 13 by caulking. A sleeve 13a is axially extended from a center part of the rotor hub 13 toward the rotor yoke 5 side. The shaft 4 is integrally fitted into the hole of the sleeve 13a by press fit, shrink fit, adhesive, etc. In the rotor hub 13, a projection 13b (see FIG. 2B) is provided on one axial side opposite to the sleeve 13a side. The rotor magnet 9 is integrally attached on an inner circumferential surface of the rotor yoke 5. In the rotor magnet 9, N-poles and S-poles are alternately formed and faced to the pole teeth 11b of the stator 11.

The tilt mirror 3 is integrated with the rotor 12. As shown in FIG. 1, the tilt mirror 3 is formed into a multiple truncated pyramid shape and has a plurality of the reflective surfaces (e.g., four reflective surfaces) 3a, whose inclination angles are different from each other. A shaft hole (through-hole) 3b, through which the rotor shaft 4 can be inserted, is formed at a center part of the tilt mirror 3. A recessed part 3c, which encloses the shaft hole 3b, is formed in a top part of the tilt mirror 3. One end part of the rotor shaft 4 is inserted into the recessed part 3c, and a press spring (elastic member, e.g., plate spring) 14 and a retaining washer (retainer section) 15 are respectively attached to the rotor shaft 4, so that the tilt mirror 3 can be retained on the rotor shaft 4. Concretely, the retaining washer 15 of the rotor shaft 4 and the press spring 14, which is provided between the retaining washer 15 and an inner bottom part 3h of the recessed part 3c, are accommodated in the recessed part 3c together with an end part 4a of the rotor shaft 4.

With the above described structure, an axial size of the optical scanner 1 can be downsized, and an axial space for attaching the tilt mirror 3 can be smaller. Further, even if an irradiation range of a scanning light is widened, the retaining washer 15, the press spring 14 and the end part 4a of the rotor shaft 4 are accommodated in the recessed part 3c, so that irregular reflection on the accommodated members can be prevented and reflection performance of the tilt mirror 3 can be sufficiently maintained.

The reflective surfaces 3a of the tilt mirror 3 are mirror surfaces, which are formed by vapor-depositing metal on a material of the tilt mirror 3 (e.g., metallic material, resin material) or polishing the same.

A recessed part 3d, in which the rotor yoke 5 is accommodated, is formed on a bottom side of the tilt mirror 3. In case that the tilt mirror 3 is made of a metallic material, the recessed part 3c, which is formed in the top part of the tilt mirror 3, is formed by spot facing. On the other hand, in case that the tilt mirror 3 is made of a resin material, the recessed part 3c is formed by resin molding.

Figures 2A, 2B:
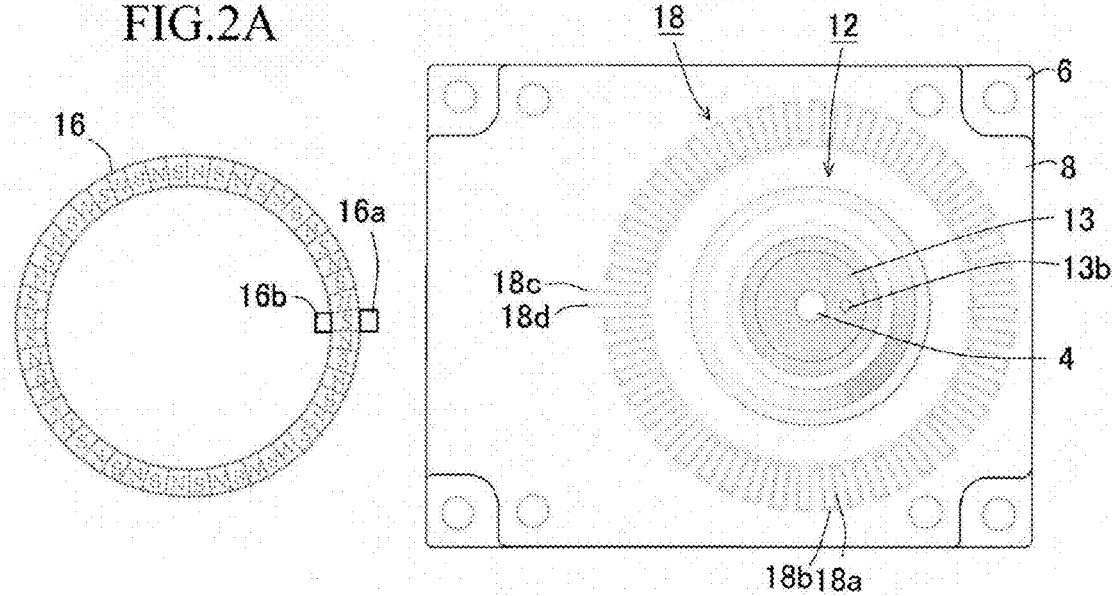
FIG. 2A is a plan view of an FG magnet shown in FIG. 1.
FIG. 2B is a plan view of a motor substrate on which a motor is mounted.

A circular magnetized section (FG magnet) 16 is integrally attached to a lower surface of the tilt mirror 3 shown in FIG. 1, which has the reflective surfaces 3a. Namely, the FG magnet 16 is provided along an outer edge of an axially maximum width part of the tilt mirror 3. The FG magnet 16 is directly integrated with the outer edge of the lower end surface of the tilt mirror 3, which faces the motor substrate 8. As shown in FIG. 2A, in the circular FG magnet 16, magnetic N-poles and magnetic S-poles are alternately formed. Number of the magnetic poles of the FG magnet 16, e.g., 120, is much greater than that of the rotor magnet 9.

As shown in FIG. 2A, a position detecting projection (position detecting section) 16a is radially outwardly projected from a part of the circular FG magnet 16. A circumferential position of the position detecting projection 16a and that of a reference reflective surface (rotational reference surface) are corresponded to each other. A magnetic pole of the position detecting projection 16a may be N-pole or S-pole. As shown in FIG. 2B, the position detecting projection 16a corresponds to a circumferential position of a projection 13b of the rotor hub 13. Note that, the position detecting projection 16a may be radially inwardly projected form the FG magnet 16.

As shown in FIG. 2B, a frequency generation pattern (FG pattern) 18 is formed on a surface of the motor substrate 8, which faces the FG magnet 16. The FG pattern 18 is constituted by: a pattern of generation wire elements 18a, which are radially formed and arranged in a circumferential direction; and a pattern of connection wire elements 18b, which are formed in the circumferential direction to connect the adjacent generation wire elements 18a to each other. The both patterns of the generation wire elements 18a and the connection wire elements 18b are formed like rectangular waves and alternately continued in the circumferential direction. FG signals are outputted from a pair of lead wires 18c and 18d. When the FG magnet 16 shown in FIG. 2A is rotated above the FG pattern 18 of the motor substrate 8, an induced electromotive force is induced in each of the generation wire elements 18a of the FG pattern 18, so that the FG signals can be detected from the pair of lead wires 18c and 18d.

The reference reflective surface of the tilt mirror 3 is corresponded to the circumferential position of the projection 13b of the rotor hub 12 shown in FIG. 2B. The Hall element (magnetic sensor: not shown), which faces the position detecting projection 16a, is provided to the motor substrate 8. The Hall element 21 detects a detection signal every time the tilt mirror 3 rotates once from the reference reflective surface. The detected signals are used for controlling a rotational speed or a number of rotation of the tilt mirror 3.

An example of a manner of assembling the optical scanner will be explained. In FIG. 1, the motor 2 is assembled by steps of: attaching the base plate 6 and the motor substrate 8 to the bearing housing 7; attaching the stator 11; and inserting the rotor shaft 4 of the rotor 12 into the through-hole of the bearing housing 7 so as to rotatably hold the rotor shaft 4 by the first and second bearing sections 10a and 10b.

By fitting the projection 13b of the rotor 12 in a recessed part (not shown) of the tilt mirror 3, circumferential positions of the reference reflective surface of the tilt mirror 3 and the circumferential position of the projection 13b of the rotor hub 13 can be aligned, the reference reflective surface of the tilt mirror 3 can be aligned with the position detecting projection 16a of the FG magnet 16, and these members are assembled in this state.

Further, the one end of the rotor shaft 4 is penetrated through the shaft hole 3b of the recessed part 3c formed in the upper surface of the tilt mirror 3, and the press spring 14 and the retaining washer 15 are fitted in the recessed part 3c, so that the tilt mirror 3 can be attached to the rotor shaft 4 and retained thereon. The other end of the rotor shaft 4 is retained, by a washer 20, without being detached from the bearing housing 7 (the second bearing section 10b).

As described above, the retaining washer 15 of the rotor shaft 4, which is provided in the recessed part 3c formed in the top part of the tilt mirror, and the press spring 14, which always biases the tilt mirror 3 toward the rotor 12, are accommodated in the recessed part 3c together with the end part 4a of the rotor shaft 4. Therefore, the optical scanner can be downsized in the axial direction, and reflection performance of the tilt mirror 3 can be sufficiently maintained without being irregularly reflected on the accommodated members, even if the irradiation range of the scanning light is widened.

Successively, another embodiment of the optical scanner relating to the present invention will be explained with reference to FIG. 3. Note that, numeric symbols of the structural elements employed in the above described embodiment are assigned the same numeric symbols.

Figure 3:
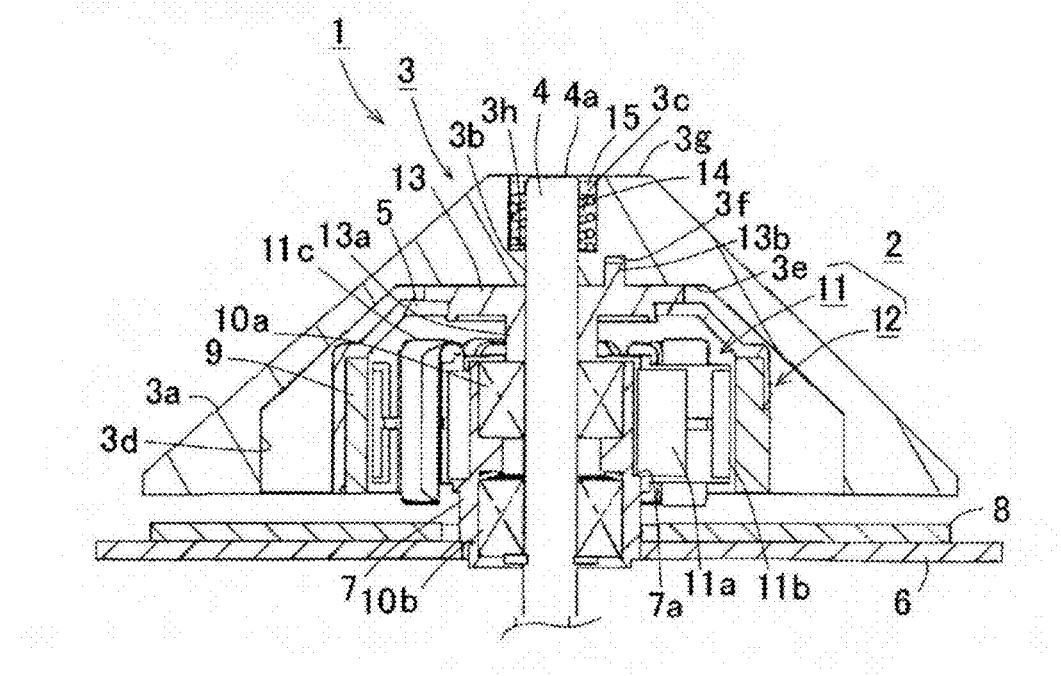
FIG. 3 is an axial sectional view of another optical scanner relating to the present invention.

In FIG. 3, the optical scanner 1 includes the motor 2 and the tilt mirror 3, which has a plurality of the reflective surfaces 3a, whose inclination angles are different from each other. The tilt mirror 3 is attached to the one end part of the motor shaft 4 together with the rotor yoke 5, and they are prohibited from rotating with respect to and detaching from the rotor shaft 4. By providing the reflective surfaces 3a whose inclination angles are different from each other, light quantity of the scanning light can be increased and a wide area can be scanned with the reflected light.

Firstly, a structure of the motor 2 will be explained. The bearing housing 7 is integrally attached to the base plate 6. The substrate 8, on which the Hall element for detecting magnetic poles of the rotor magnet 9, etc. are mounted, is attached on the base plate 6.

The structure of the stator 11, which is attached to the cylindrical bearing housing 7, is the same as that of the stator 11 described in the above described embodiment, so structures of the rotor 12 and the tilt mirror 3 will be mainly explained.

The rotor shaft 4 of the rotor 12 is rotatably held by a first bearing section 9a and a second bearing section 9b provided in the stator housing 7. In the rotor 12, the cylindrical rotor yoke 5 is integrally attached to the rotor hub 13 by caulking. The sleeve 13a is axially extended from the center part of the rotor hub 13 toward the rotor yoke 5 side. The shaft 4 is integrally fitted into the hole of the sleeve 13a by press fit, shrink fit, adhesive, etc. In the rotor hub 13, the projection 13b is provided on one axial side opposite to the sleeve 13a side. A plurality of the projections 13b may be formed. The rotor magnet 9 is integrally attached on the inner circumferential surface of the rotor yoke 5. In the rotor magnet 9, N-poles and S-poles are alternately formed and faced to the pole teeth 11b of the stator 11.

The tilt mirror 3 is integrated with the rotor 12. The tilt mirror 3 is formed into the multiple truncated pyramid shape and has a plurality of the reflective surfaces 3a whose inclination angles are different from each other. The shaft hole (through-hole) 3b, through which the rotor shaft 4 can be inserted, is formed at the center part of the tilt mirror 3. The reflective surfaces 3a of the tilt mirror 3 are mirror surfaces, which are formed by vapor-depositing metal on the material of the tilt mirror 3 (e.g., metallic material, resin material) or polishing the same. The recessed part 3d, in which the rotor yoke 5 is accommodated, is formed on the bottom side of the tilt mirror 3. A fitting hole 3f is formed in an inner bottom part 3e of the recessed part 3d.

The optical scanner 1 is assembled by steps of: attaching the stator 11 to the stator housing 7; inserting the rotor shaft 4 of the rotor 12 into the stator housing 7 so as to rotatably hold the rotor shaft 4; and inserting the rotor shaft 4 into the shaft hole 3b of the tilt mirror 3. In the tilt mirror 3, the rotor yoke 5 is accommodated in the recessed part 3d, and the inner bottom part 3e is stacked onto the rotor hub 13 such that the projection 13b is fitted in the fitting hole 3f.

By recession/projection-fitting the projection 13b into the fitting hole 3f, relative rotation of the tilt mirror 3 with respect to the rotor 12 can be prevented, and they can be easily assembled.

As shown in FIG. 3, a flat part 3g is formed in the top part of the tilt mirror 3. The recessed part 3c, through which the rotor shaft 4 is penetrated, is formed in the flat part 3g. The retaining washer (retainer section) 15 is provided in the recessed part 3c, through which the rotor shaft 4 is penetrated. An axial position of the retaining washer 15 is fixed by a snap ring (e.g., e-ring), which is fitted to the rotor shaft 4.

A compressed coil spring (elastic member) 14 is provided between the inner bottom part 3h of the recessed part 3c and the retaining washer 15. The tilt mirror 3 is always biased toward the rotor yoke 5 by the elastic force of the coil spring 14, so that the tilt mirror 3 can be retained in the axial direction.

Note that, the elastic member provided in the recessed part 3c is not limited to the coil spring 14. For example, a plate spring, a disc spring, a rubber member, etc. may be used as the elastic member.

In the latter embodiment too, the retaining washer 15, which is provided in the recessed part 3c formed in the top part of the tilt mirror to retain the rotor shaft 4, and the press spring 14, which always biases the tilt mirror 3 toward the rotor 12, are accommodated in the recessed part 3c together with the end part 4a of the rotor shaft 4. Therefore, the optical scanner can be downsized in the axial direction, and reflection performance of the tilt mirror 3 can be sufficiently maintained without irregular reflection, even if the irradiation range of the scanning light is widened.

In the above described embodiments, the polygon mirror having a plurality of the reflective surfaces, whose inclination angles are different from each other, is used in the optical scanner. Further, a polygon mirror having a plurality of non-inclined reflective surfaces may be used in the optical scanner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alternations could be made hereto without departing from the spirit and scope of the invention.

What is claimed is:

1. An optical scanner, comprising:
   a motor having a rotor shaft;
   a rotor being attached to one end part of the rotor shaft;
   a polygon mirror having reflective surfaces, the polygon mirror being attached to the rotor shaft together with the rotor; and
   a bearing section being provided to a stator housing and capable of rotatably holding the rotor shaft,
   wherein a recessed part, through which the rotor shaft is penetrated, is formed in a top part of the polygon mirror, and
   a retainer section of the rotor shaft, which is provided in the recessed part, and an elastic member, which is provided between the retainer section and an inner bottom part of the recessed part and which always biases the polygon mirror toward the rotor, are accommodated in the recessed part together with an end part of the rotor shaft.

2. The optical scanner according to claim 1, wherein a spring member is fitted between the inner bottom part of the recessed part and the retainer section.

3. The optical scanner according to claim 1, wherein the rotor and the polygon mirror are recession/projection-fitted to each other so as to prohibit from relatively rotating with respect to each other.

4. The optical scanner according to claim 1, wherein the polygon mirror has a plurality of the inclined reflective surfaces whose inclination angles are different from each other.

* * * * *